(12) United States Patent
Grubish et al.

(10) Patent No.: US 7,418,186 B1
(45) Date of Patent: Aug. 26, 2008

(54) FIBER RETENTION SLEEVE

(75) Inventors: Christopher S. Grubish, Solon, OH (US); Keith A. Miller, Twinsburg, OH (US); George Dudash, Willowick, OH (US); John L. Hornsby, Ravenna, OH (US); Mark A. Stransky, Munroe Falls, OH (US); Randy G. Cloud, Mentor, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 11/801,802

(22) Filed: May 11, 2007

(51) Int. Cl.
*G02B 6/00* (2006.01)

(52) U.S. Cl. ........................ 385/137; 385/135

(58) Field of Classification Search ............ None
See application file for complete search history.

(56) References Cited

U.S. PATENT DOCUMENTS

| 5,146,532 | A | 9/1992 | Hodge |
| 5,283,853 | A | 2/1994 | Szegda |
| 5,323,481 | A | 6/1994 | Tokumaru et al. |
| 5,566,269 | A | 10/1996 | Eberle, Jr. et al. |
| 5,675,124 | A | 10/1997 | Stough et al. |
| 5,734,777 | A | 3/1998 | Merriken et al. |
| 5,745,633 | A | 4/1998 | Giebel et al. |
| 6,071,001 | A | 6/2000 | Denuto et al. |
| 6,390,688 | B1 | 5/2002 | Lutzen et al. |
| 6,600,858 | B2 | 7/2003 | Lutzen et al. |
| 6,867,371 | B2 | 3/2005 | Daoud et al. |
| 2002/0181884 | A1* | 12/2002 | Fujioka et al. ............... 385/53 |
| 2003/0099431 | A1* | 5/2003 | Wu et al. ..................... 385/24 |
| 2004/0258385 | A1* | 12/2004 | Kadrnoska et al. ........ 385/136 |
| 2007/0053646 | A1* | 3/2007 | Kendricks ................. 385/136 |

* cited by examiner

*Primary Examiner*—Tina M Wong
(74) *Attorney, Agent, or Firm*—Fay Sharpe LLP (57) ABSTRACT

A fiber retention device is provided for retention of fibers such as optical fibers, tubing, cables, buffer tubes and other elongate objects. The retention device includes, generally, a mounting retainer and a resilient sleeve. The mounting retainer is formed of a resilient material and defines one or more generally U-shaped support channels. The resilient sleeve is positioned in the U-shaped support channel and defines at least one expandable passageway for receiving a fiber therein. The passageway diameter is less than the fiber diameter in a pre-load orientation or relaxed condition prior to inserting the fiber into the passageway. The support channel selectively includes a plurality of tabs for locating the sleeve therein including tabs on a bottom wall for resisting relative horizontal movement and tabs on a side wall for resisting relative vertical movement of the sleeve within the channel. The sleeve is positively located by the channel, and the fiber is retained and strain relieved by the elastomer sleeve. A mounting flange is provided for coupling a plurality of mounting retainers in a coupled orientation as desired.

30 Claims, 8 Drawing Sheets

FIBER RETENTION SLEEVE

BACKGROUND

The disclosure pertains generally to retention devices for providing locational stability, restraint, and strain-relief to elongate objects such as tubing, optical fibers, wires, cables, buffer tubes and the like. The preferred embodiments will be described in connection with such retention devices for optical fibers, such as, for example, splice trays. Splice tray mechanisms can be used to route and store optical fibers therein. However, the application is not limited to use with optical fibers and, instead, finds application with any elongate tubular objects such as electrical wires, tubes, pipes, and the like. "Fibers" or "optical fibers" will be used hereinafter to refer to all of these.

Optical fibers are present in trunk and feeder lines and can be in the form of single or multiple strands. There is often a need to restrain and/or to channel such optical fiber strands to prevent their damage and to provide a solid base for termination, branching or connection. When there is a termination or a branch of these fibers, such as at a feeder to a group of subscribers or at the end of a trunk, it is desirable to locate the fibers at a relatively fixed position to facilitate their connection. Further, they should be located, routed, stored, and retained positively so that they can be identified easily and not kink or break. In conjunction with these restraints, it is further desirable to strain relieve the fibers so that the mechanical flexions on another portion of the fiber strand do not break a termination.

Many techniques, i.e., tie wraps, for optical fiber restraint and strain-relief have been used but most are time consuming, cumbersome, and can potentially cause damage to the fiber optics. In one example, fiber optics can have a buffer tube or cover surrounding the fiber optic which are then bundled and wrapped with a tie wrap and then secured to a splice tray. In some installations, another step is involved whereby the cover is first wrapped with felt prior to bundling and securing with the tie wrap. Overall, therefore, effective restraints for optical fibers should be relatively strong, easy to install, modular, and inexpensive.

SUMMARY

An optical fiber retention device is provided for retention of optical fibers comprising a first mounting retainer integrally formed of a resilient material and having one or more generally U-shaped support channels. The retention device further comprises an elastomer sleeve having at least one expandable passageway for positioning an optical fiber. The passageway can have a diameter and the optical fiber can have a diameter such that the passageway diameter is less than the optical fiber diameter in a pre-load orientation. The support channel can include a plurality of tabs for locating the sleeve therein wherein at least one tab can be mounted on a bottom wall for resisting horizontal movement and at least another tab can be mounted on a side wall for resisting vertical movement of the sleeve within the channel. The mounting retainer can include a mounting flange and a locking rib integrally formed with the mounting retainer for slidably securing the mounting retainer to a base member such that the sleeve is positively located by the channel, and the optical fiber is retained and strain relieved by the elastomer sleeve.

The disclosure further provides an optical fiber retention device comprising a mounting retainer integrally formed of a resilient material and having one or more generally U-shaped support channels. The device further comprises an elastomer sleeve having a plurality of expandable passageways extending along the length of the sleeve for positioning optical fibers therein. The passageways can have a diameter and the optical fibers can have a diameter such that the passageway diameters are less than the optical fiber diameters in a pre-load orientation. The support channel can include side walls for constraining expansion of the elastomer sleeve therein, and the elastomer sleeve can compress the passageways around the optical fibers in a post-load orientation.

And still further, the disclosure provides for an optical fiber retention device comprising a base member having one or more generally U-shaped support channels. The device further comprises an elastomer sleeve having a plurality of expandable passageways for positioning optical fibers therein. The passageways can have a diameter and the optical fibers can have a diameter such that the passageway diameters are less than the optical fiber diameters in a pre-load orientation. At least two of the passageways can have a common slot extending along the length of the sleeve for receiving the optical fibers into the at least two passageways. The support channel can include a plurality of tabs for locating the sleeve therein, wherein at least one tab can be mounted on a bottom wall for resisting horizontal movement and at least another tab can be mounted on a side wall for resisting vertical movement of the sleeve within the channel. The support channels can include side walls for constraining expansion of the elastomer sleeve therein. The elastomer sleeve compresses the passageways around the optical fibers in a post-load orientation.

These and other objects, features, and aspects of the disclosure will be more fully understood and better described when the following detailed description is read in conjunction with the appended drawings wherein:

DETAILED DESCRIPTION

Figure 1:
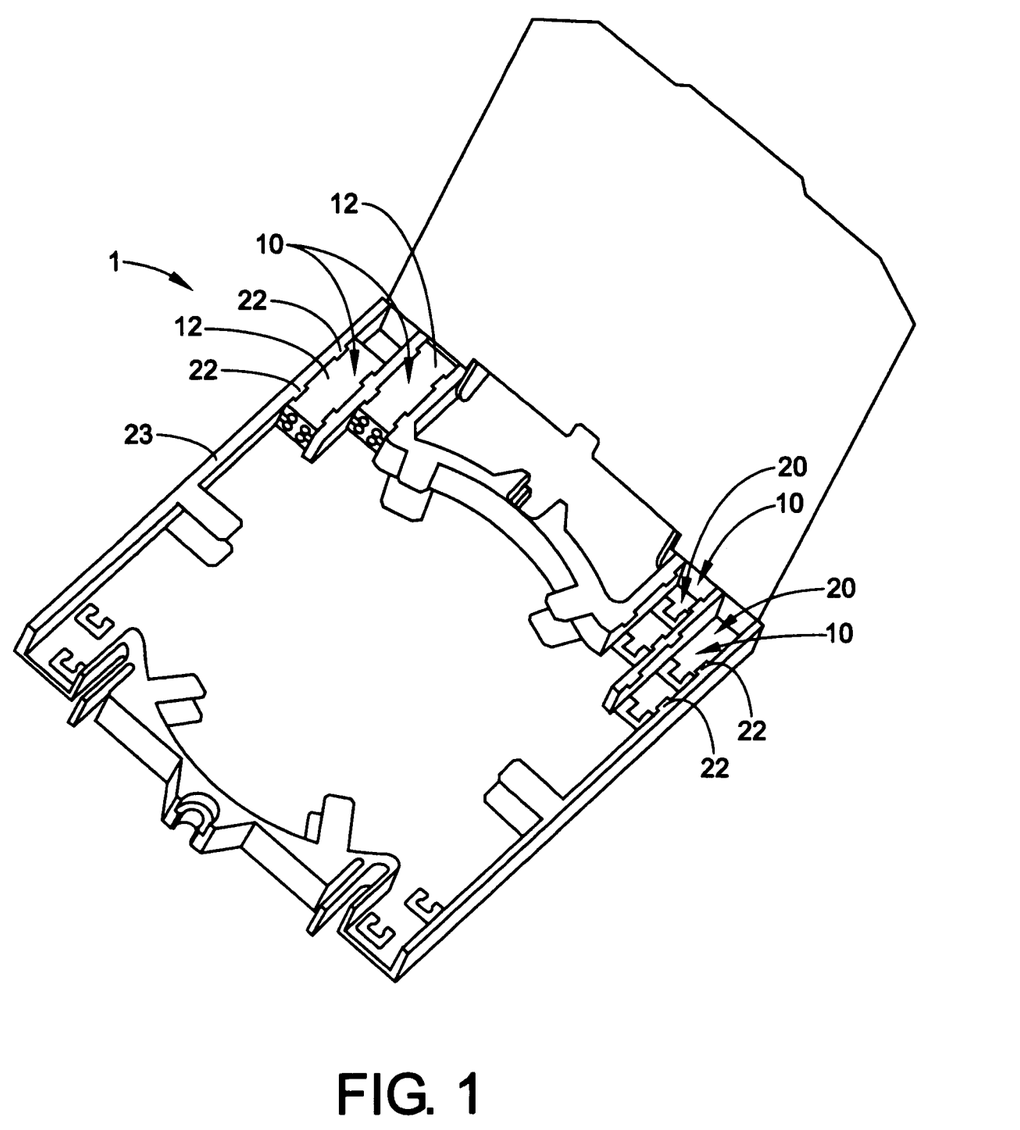
FIG. 1 is a perspective view of an optical fiber splice tray including a fiber optic retention sleeve in accordance with a first embodiment and mounted in a channel defined by the splice tray base.

In accordance with one embodiment, as shown in FIG. 1, an optical fiber splice tray 1 includes a mounting retainer portion 10 adapted to carry one or more resilient cable retention sleeves 12 constructed in accordance with the disclosure. As illustrated, the mounting retainer portion 10 is formed integrally with the splice tray. In other embodiments, assemblies of retention sleeves and one or more individual mounting retainers comprise a fiber retention device such that groups of fibers, cables and the like can be retained and strain relieved. The optical fiber cables 14 shown in the embodiment illustrated can typically comprise a glass optical fiber 16 having a 125 micron (0.125 mm) outer diameter surrounded by an outer cover 18 (refer to FIG. 10). However, the optical fiber may be any suitable diameter and any suitable material for propagating light, such as plastic or the like. The outer cover 18 can be a polymer tube formed from an elastomer material, or any other material which is highly resilient with a good resistance to flex fatigue at low and high temperatures, and is resistant to oils and chemicals. Further, although the cable retention sleeves are preferably used to retain fiber optic cables relative to associated support structures such as splice trays for example, the sleeves and various retainer portions of the present application are well suited for use with any elongate objects such as copper wires, tubes and the like.

Referring still to FIG. 1, the retention sleeves 12 and/or mounting retainers can be mounted to or received in any suitably formed associated support structure such as, for example, an optical fiber splice tray 10. As shown in FIG. 1, the splice tray 10 includes support channels 20 having a plurality of tabs 22 for locating one or more sleeves 12 therein and relative to the splice tray. At least one tab (not illustrated) can be mounted on a bottom wall for resisting horizontal movement and at least another tab 22 can be mounted on a side wall 23 for resisting vertical movement of the sleeve 12 when the sleeve is suitably positioned within the channel 20. Although not shown in FIG. 1, the sleeve 12 can be mounted into the channels 20, for example, after the optical fibers have been inserted into the sleeves 12. The sleeves 12 can be positioned and slid horizontally into one end of the channel 20 until firmly seated against the tab mounted on the bottom wall. Alternatively, the sleeves can be inserted vertically by pushing the sleeves past the tabs 22 mounted on the side wall.

The retention sleeve 12 in accordance with the embodiments is preferably formed of a silicone material. It is to be appreciated, however, that the sleeve 12 can be formed from other materials including, for example, polypropylene, rubber, urethane, and other soft plastics. Fiberglass may be added to enhance the strength and rigidity of the material. The hardness of the sleeve 12 can be in the range of, for example, 40-80 Shore A. The resilient flexible material of the sleeve 12 produces a snug fit for the optical fibers positioned in passageways or grooves, to be described hereinafter, without breakage or substantial compressive forces on the fibers.

Figure 2:
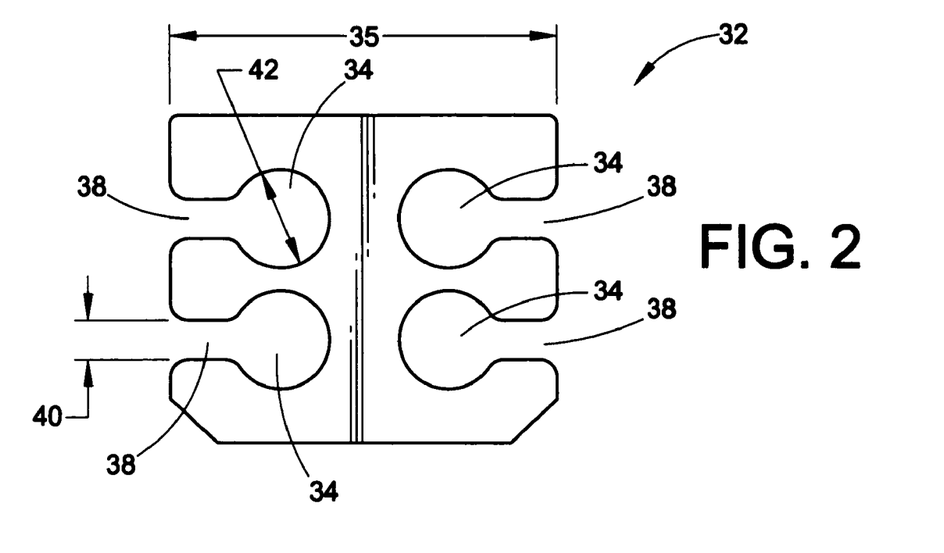
FIG. 2 is an end elevational view of the fiber optic retention sleeve according to the first embodiment.
Figure 3:
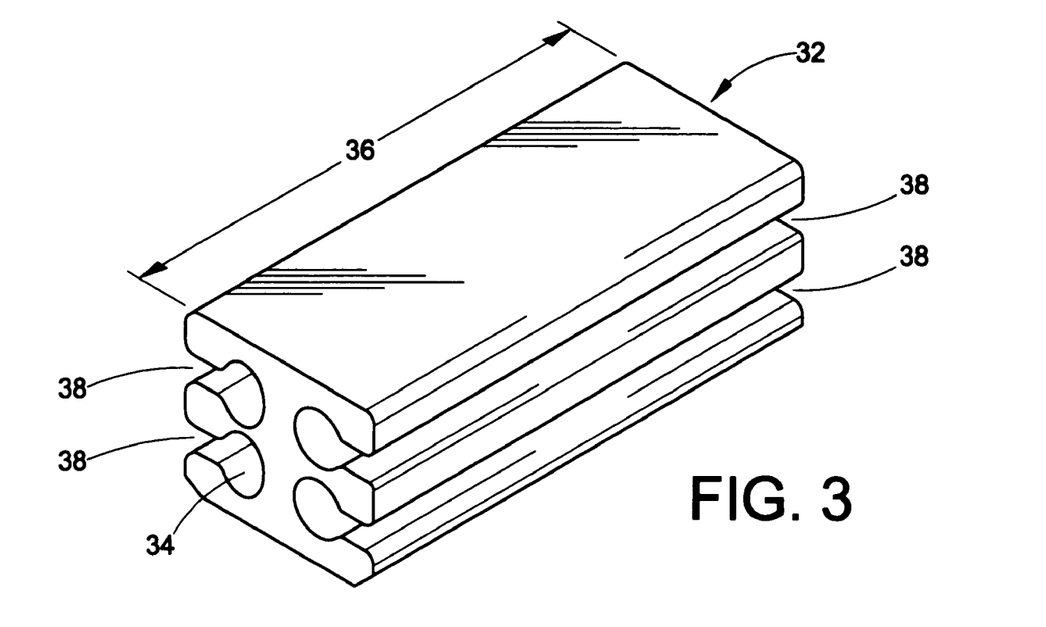
FIG. 3 is a perspective view of the fiber optic retention sleeve shown in FIG. 2.

Referring now to FIGS. 2-7, several embodiments of the subject resilient cable retention sleeve are therein illustrated. FIGS. 2 and 3 illustrate a sleeve 32 having a substantially rectangular shape defining four elongate passageways 34 extending the length 36 of the sleeve 32. Each of the passageways 34 can have an associated slot 38 for enabling a fiber optic to be inserted therethrough. It is to be appreciated that the slot 38 can include a height 40 less than the diameter 42 of the associated passageway. In a pre-load orientation, i.e., when the sleeves are empty, the diameter 42 of the passageways 34 are sized such that the diameter 42 of the passageways 34 are less than a diameter of an associated fiber optic to be secured therein. The sleeves, including the passageways therethrough, can provide for positive location, restraint, and strain-relief to the fiber optics positioned therein in a post-load orientation.

Figure 4:
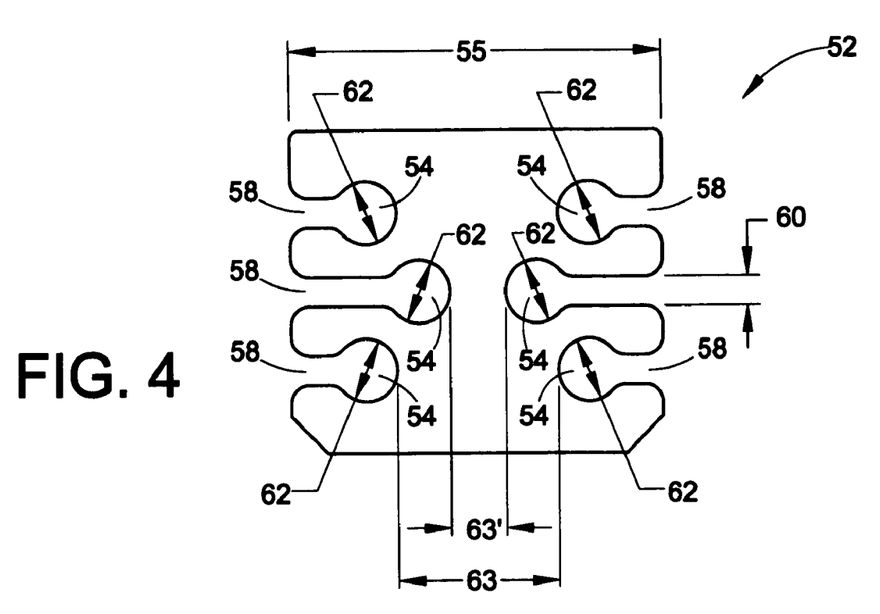
FIG. 4 is an end elevational view of a fiber optic retention sleeve according to a second embodiment.
Figure 5:
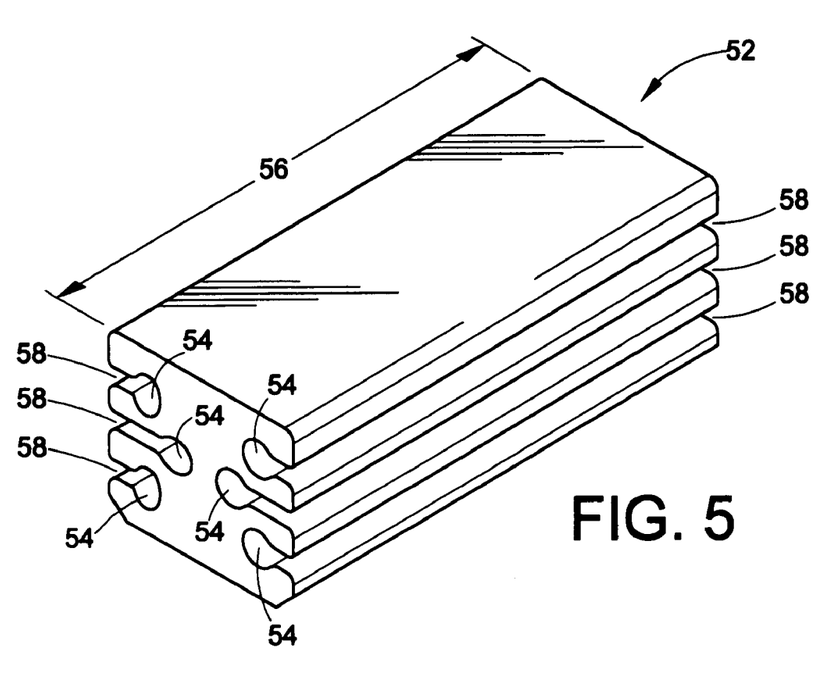
FIG. 5 is a perspective view of the fiber optic retention sleeve shown in FIG. 4.

FIGS. 4 and 5 illustrate a sleeve 52 having a substantially rectangular shape defining six elongate passageways 54, extending the length 56 of the sleeve. Each of the passageways 54 can have an associated slot 58 for enabling a fiber to be inserted therethrough. It is to be appreciated that the slot 58 can include a height 60 less than the diameter 62 of the associated passageway. In a pre-load orientation, i.e., when the sleeves are empty, the diameter 62 of the passageways 54 can be sized such that the diameter 62 of the passageways 54 are less than a diameter of an associated fiber optic cable to be secured therein. As shown in FIGS. 4 and 5, multiple passageways associated with one side of the sleeve can include passageways that are staggered relative to a vertical plane as viewed in the figures thereby providing more room for expansion of the passageways in a post-load orientation. In that way, compressed regions of the sleeve do not "stack up" along the vertical plane. For example, the upper and lower pairs of passageways are spaced apart by a first distance 63 while the middle pairs of passageways are spaced apart by a second distance 63' less than the first distance 63.

Figure 6:
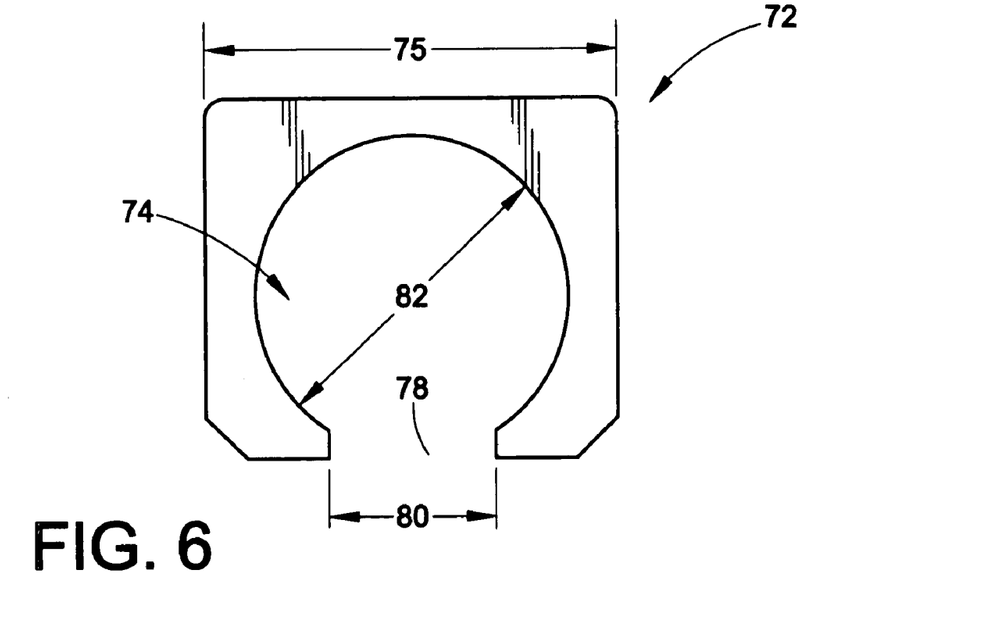
FIG. 6 is an end elevational view of a fiber optic retention sleeve according to a third embodiment.
Figure 7:
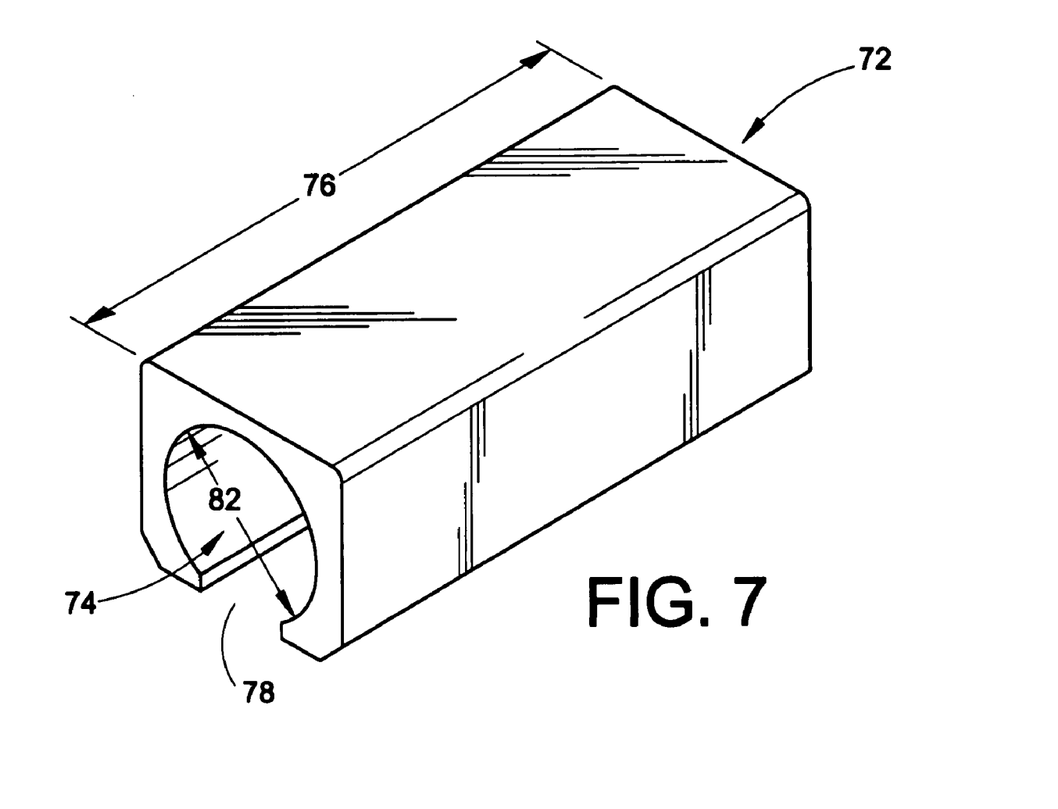
FIG. 7 is a perspective view of the fiber optic retention sleeve shown in FIG. 6.

FIGS. 6 and 7 display a sleeve 72 having a single passageway 74, extending the length 76 of the sleeve. The passageway 74 can have an associated slot 78 for enabling a fiber optic to be inserted therethrough. It is to be appreciated that the slot 78 can include a height 80 less than the diameter 82 of the passageway 74. In a pre-load orientation, i.e., when the sleeve is empty, the diameter 82 of the passageway 74 is sized such that the diameter 82 of the passageways 74 is less than a diameter of an associated fiber optic cable to be secured therein.

As discussed above, the diameter of the passageways can have a dimension which is smaller than the diameter of the fiber optic cables extending therethrough in a pre-load orientation. In addition, the outer dimension of the sleeve, for example the width of the sleeves 35, 55, 75 in a pre-load orientation, can have a dimension that is larger than the width of opposing side walls of the supporting channel in which the sleeve is inserted thereby resulting in axial forces being transmitted inward around the fiber optic cables in a post-load or mounted orientation.

Referring next to FIGS. 8-11, wherein multiple sleeves 32, 72 are shown mounted in a stacked set of retainers 90. The retainers 90 can be integrally formed of a resilient material and can include one or more generally U-shaped support channels 92. The support channels 92 can include a plurality of tabs for locating the sleeve therein. A tab 91 mounted on a bottom wall 95 of the channel 92 can provide a stop for resisting horizontal movement. Another tab or tabs 98, mounted on the side walls 100 of the channel 92 can provide a stop for resisting vertical movement.

The retainers are configured to nest so that an upper retainer 90" can be received in a lower retainer 90' substantially in a manner as shown. Preferably, although not necessarily, the retainers mutually snap fit connect with associated similar retainers in a stacked arrangement such as shown. In addition, one or more cover cap members 91, 99 are provided for covering the sleeves 32, 72, respectively, received in the retainers 90. As illustrated, a single cover cap member 91 is received in the upper retainer 90" to cover the sleeve 32 and to hold the sleeve 32 snugly in place relative to the retainer. The cap members can be locked in place by engaging members relative to the retainer such as by a snap fit or by sliding the cap members in place. The cap members are preferably positioned relative to the retainer 90" to compress the sleeves 32, 72 in place thereby adding to the integrity of the overall construction to hold the sleeves 32, 72 firmly in place yet without placing undue pressure on the associated cable members carried by the sleeves. Although illustrated as having a rectangular cross section the cap members can have a triangular or other profile to place more or less pressure on the sleeves at selected locations thereon as desired.

Figure 10:
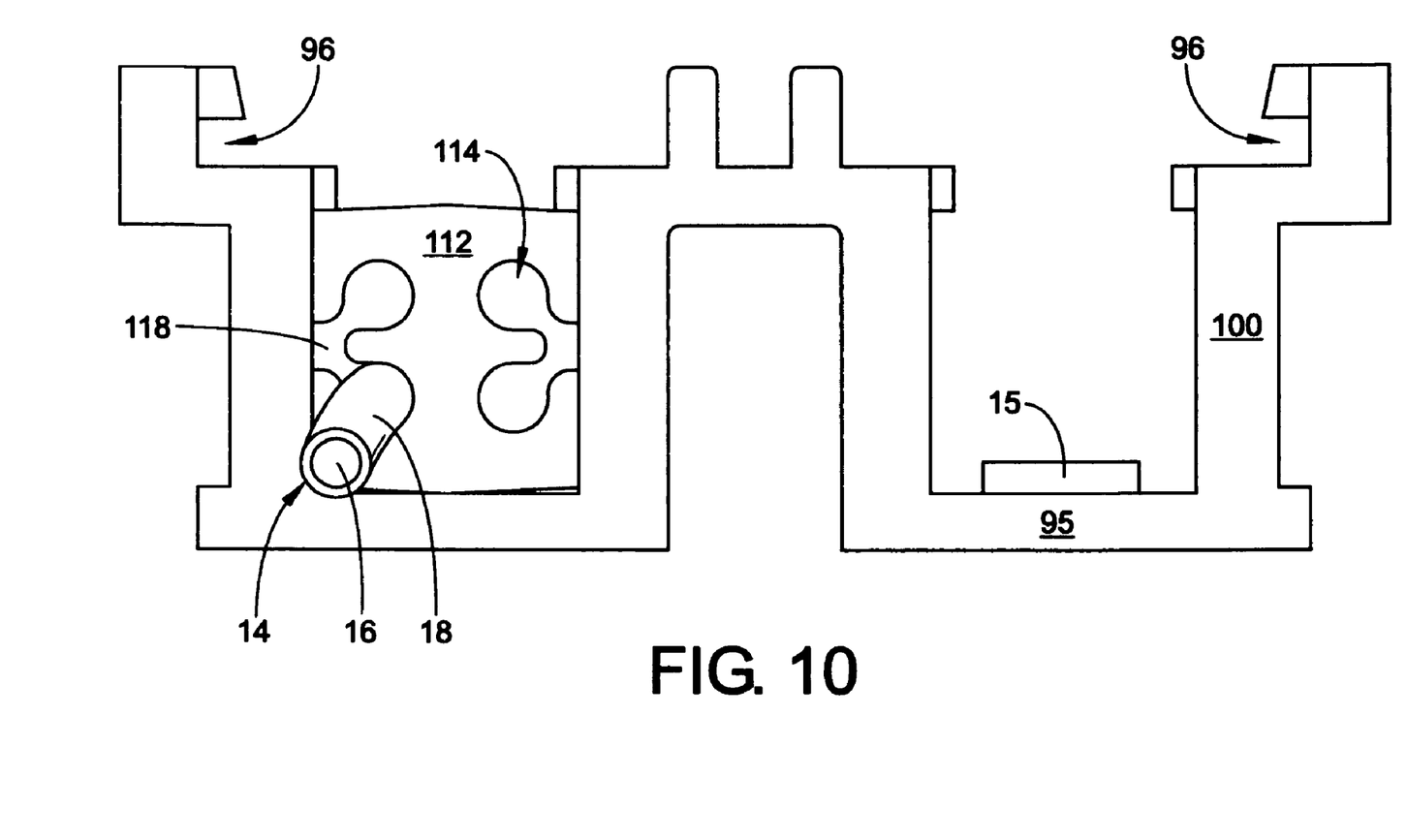
FIG. 10 is an enlarged view of a single mounting retainer holding a fiber retention sleeve according to a fourth embodiment.

It is to be appreciated that in a mounted or post-load orientation, side walls 100 of the U-shaped support channels 92 compress the sleeve tightening the passageway(s) around the fiber optic cables (FIG. 10). The resultant compressive forces are directed inward and transmitted to the passageways. Passageways in turn communicate compressive forces around the optic fiber cables. The relatively soft material of the sleeve provides retention forces on the fiber optic cables. Although not shown, it is to be appreciated that the passageways can be plugged with 'dummy' cables to provide for consistent compressive forces to all the passageways in a post-load orientation. The aforementioned properties provides for a self-adjusting and self-sealing grommet-like sleeve that can adjust to different sized cables and wires passing therethrough, and can adjust to different sized openings mounted therein. Once installed, the resilient and 'spring-like' sleeve not only retains the sleeve in the U-shaped support channel, but also provides for a dust and water resistant seal around the outer cable cover passing through the passageways.

The sleeves 32, 52, 72 can have a length 36, 56, 76 to facilitate retention of the fiber optic cables and to facilitate dust and water resistance. The ratio of the length of the sleeve to the inside diameter of a passageway can be in the range of at least three to one. One particular application includes a ratio of at least eight to one. And in still other applications, the ratio is at least fourteen to one. The relatively soft material of the sleeve, along with the length of the sleeve, provides frictional gripping forces to hold and seal a fiber optic cable therein after installation (i.e., post-load) of the sleeve in a support channel. The relatively large surface area of the cable in contact with the interior surface of a passageway can be calculated as: [pi×(diameter)×(length)]. The coefficient of static friction between the surface area of the cable and the interior surface of the passageways resists axial and radial movements of the fiber optic cables therein. It is to be appreciated that the resiliency of the sleeve allows a range of fiber optic cable sizes to pass through the passageway. In exemplary embodiments, passageway diameters from about 0.05 to about 0.50 inches and sleeve lengths in the range from about 1 to about 2 inches were used to retain and strain relieve associated fiber optic cables therein. Similar ratios can be achieved for various sized fiber optic cables and associated diameters.

Figure 8:
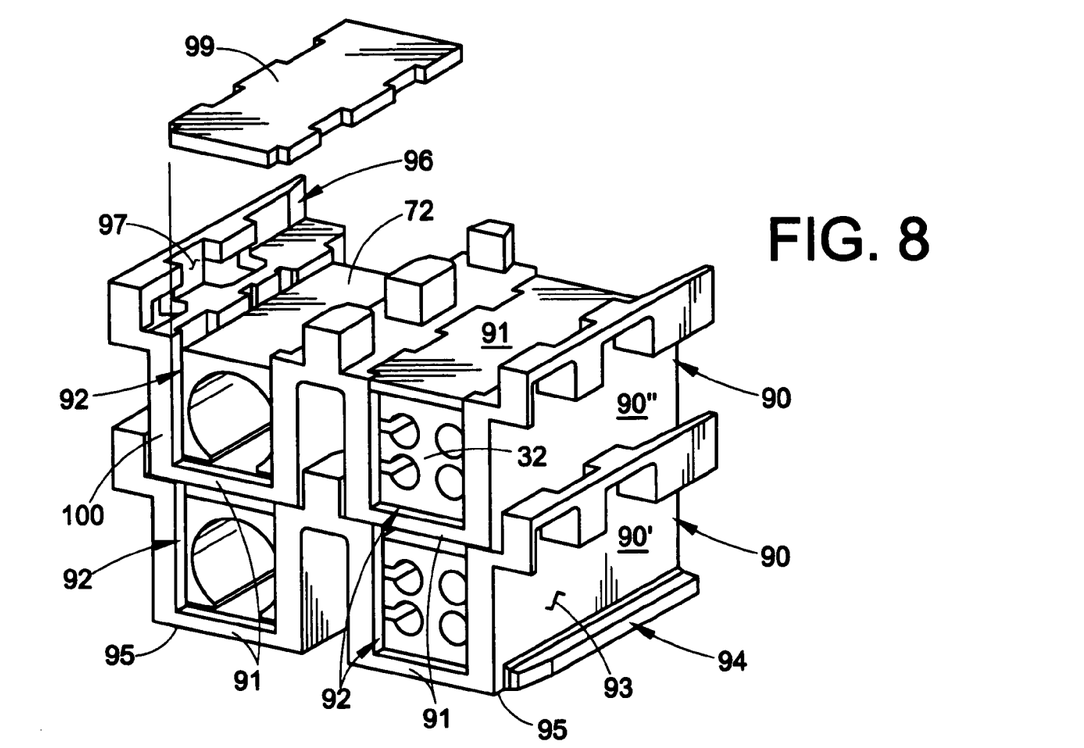
FIG. 8 is a perspective view of a pair of modular mounting retainers for mounting a plurality of fiber retention sleeves.
Figure 9:
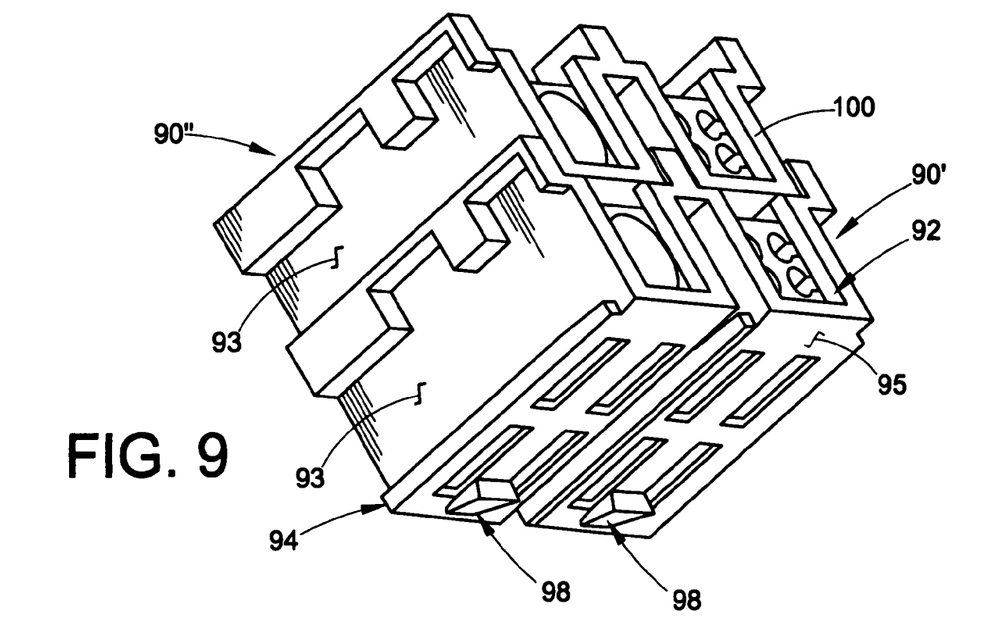
FIG. 9 is a bottom perspective view of FIG. 8.

FIGS. 8 and 9 show a pair of modular mounting retainers 90. The retainers can be formed of plastic, metal, or any other suitable material and can be formed as an integral part of an enclosure for cable equipment, as a separate mountable plate used for optical fiber routing, and can be provided anywhere there is a need to positively locate or restrain (i.e., tray, enclosure, plate, walls, cabinet, etc.) fibers, cables or other elongate objects.

The optical fiber retention device, as shown in FIGS. 8-9, can include a pair of retainers 90 each holding one or more sleeves. It is to be appreciated that the number of retainers and the types of sleeves can be adjusted to meet the requirements of the particular retention application.

The retainers 90 can include U-shaped support channels 92 having a mounting flange 94 on an exterior side 93 of the side walls 100 proximal to a bottom wall 95. The open ends of the channels 92 can be closed with an associated wedge shaped cap or cover member (not shown) to hold the sleeve snugly within the channel and, selectively, to provide further compression thereof. The retainer 90 can include a mating slot 96 on an interior side 97 of the side walls 100 distal to the bottom wall 95. The mounting flanges 94 of one retainer 90 can slidably mount to the mating slots 96 of another retainer 90. Alternatively, the mounting flanges of one retainer can be slidably secured to a mating slot of a base member of a, for example, slice tray (not illustrated). In either mounting application, the retainer can further include locking ribs 98 integrally formed with an exterior side of the bottom wall 95 of the retainer 90 for slidably securing the mounting retainer to the base member or to another retainer.

Figure 11:
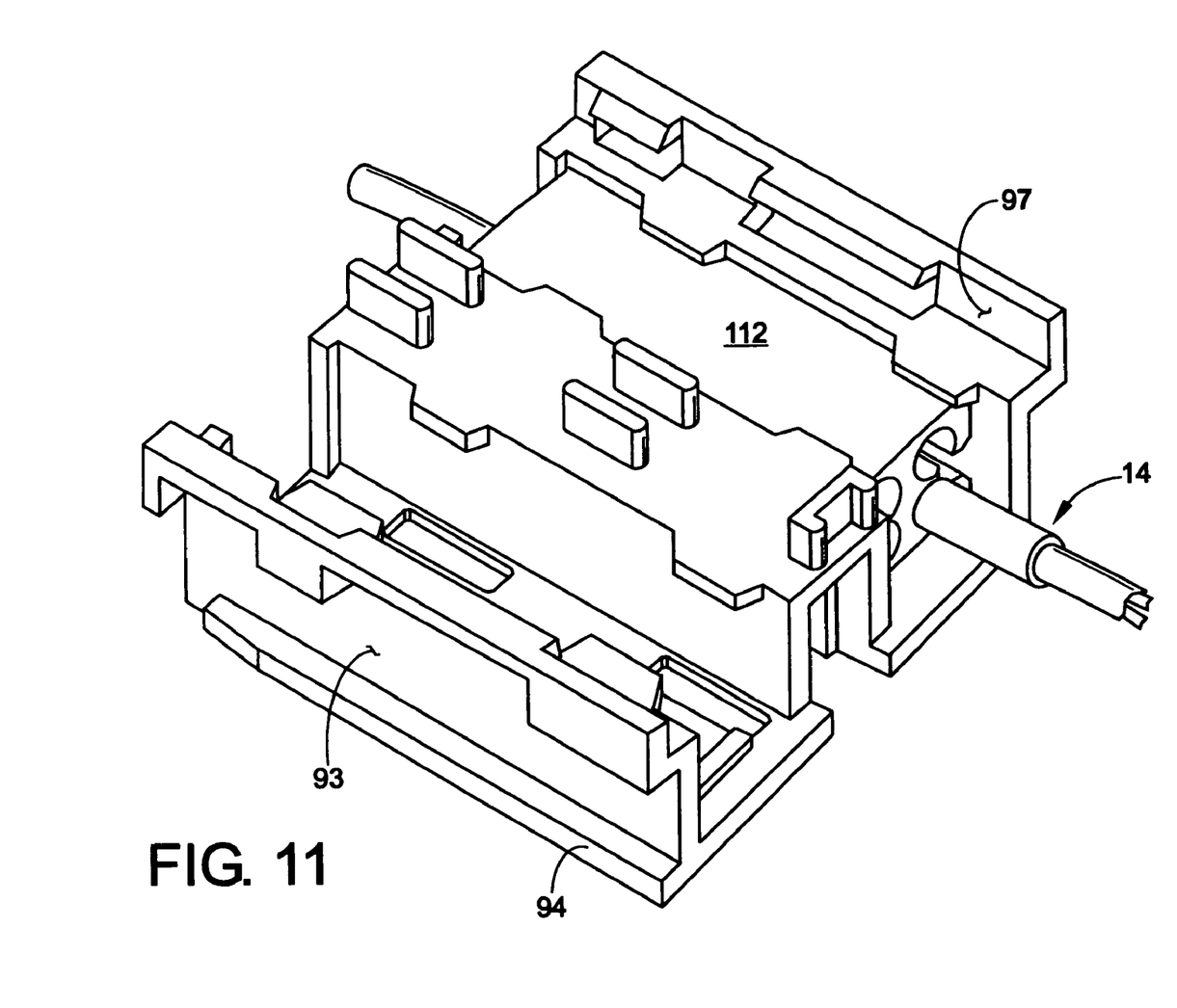
FIG. 11 is an enlarged elevational view of the mounting retainer and sleeve shown in FIG. 10; and, FIG. 12 is a perspective view of a fiber optic retention sleeve according to a fifth embodiment illustrated adjacent a mounting channel defined by an associated support structure.

FIGS. 10 and 11 illustrate another embodiment of a sleeve 112 in accordance with this disclosure. The sleeve includes four passageways 114, one of which includes a fiber optic cable 14 extending therethrough. Two of the passageways can share a common slot 118 extending along the length of the sleeve 112 for receiving optical fiber cables into the associated passageways. Similarly, an opposing pair of passageways share another slot extending along the length of the sleeve for receiving other fiber optic cables therein.

Figure 12:
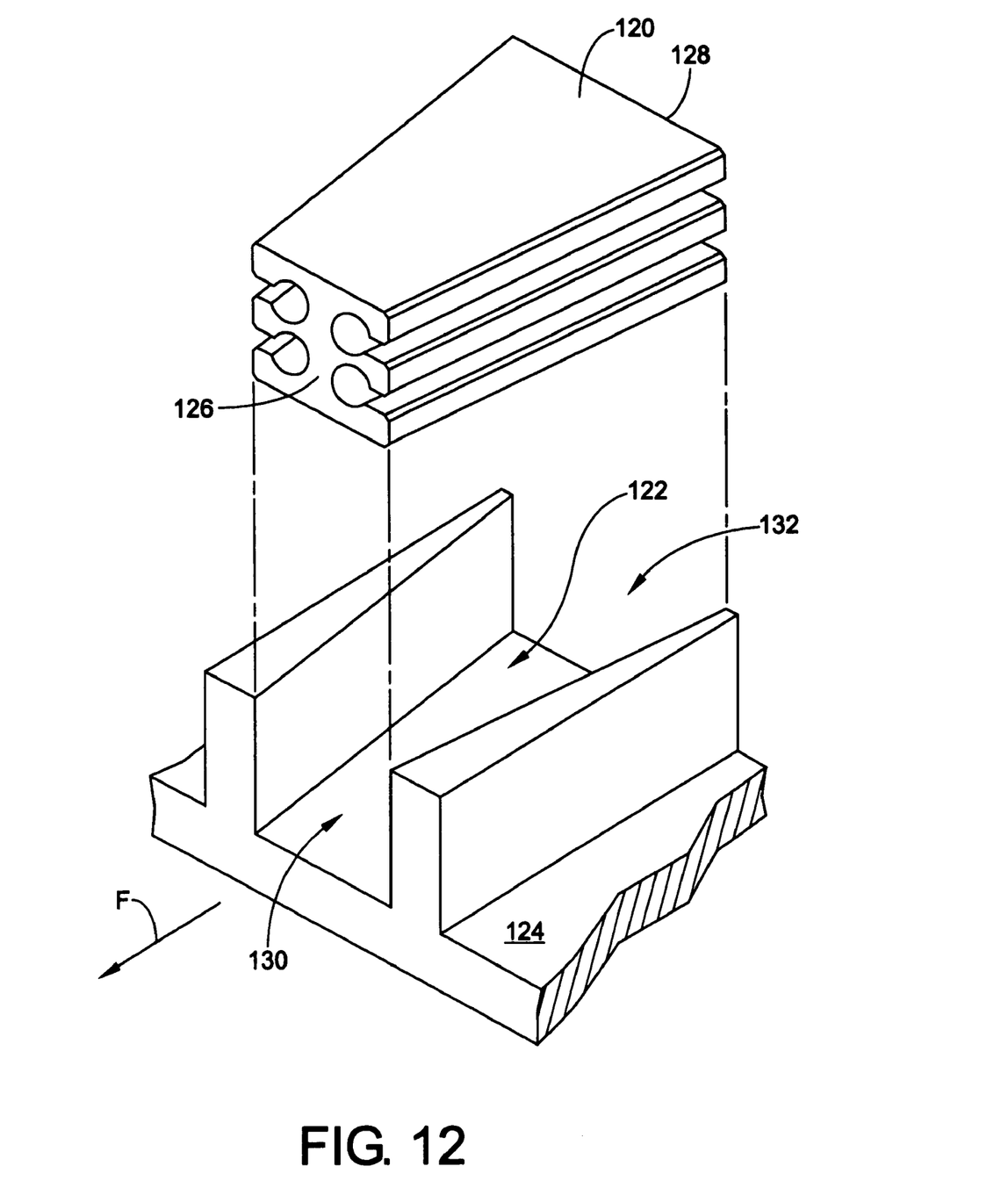

While several embodiments of the disclosure have been shown and described, it will be obvious to those skilled in the art that various modifications and changes can be made to the disclosure without departing from the spirit and scope of the disclosure as hereinafter defined in the appended claims. As an example, FIG. 12 shows a perspective view of a fiber optic retention sleeve 120 in accordance with a fifth embodiment illustrated adjacent a mounting channel 122 defined by an associated support structure 124. The sleeve 120 shown in FIG. 12 is similar to the sleeve 32 shown in FIGS. 2 and 3 except that it has a non-rectangular overall shape in a width direction. More particularly, the front face 126 of the sleeve 120 has a substantially rectangular cross section, while the rear face 128 has a substantially rectangular cross section. In this embodiment, the mounting channel 122 is tapered having a narrow opened end 130 and a wider inner end 132. Essentially, the wedge-shaped retention sleeve 120 fits into a similarly sized wedge-shaped mounting channel 122 whereby forces acting on the cables (not shown) retained in the sleeve in a direction F tend to urge the sleeve into tighter compression around the sleeve thus enhancing the grip therebetween. It is to be appreciated that other sizes, shapes, and overall configurations of resilient fiber retention sleeves are contemplated within the spirit and scope of the present application.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An optical fiber retention device comprising:
    a first mounting retainer formed of a resilient material and defining a generally U-shaped support channel extending along a longitudinal axis;
    an elastomer sleeve defining an expandable passageway adapted to receive an associated optical fiber having a fiber outer diameter, the expandable passageway having a passageway diameter in a pre-load orientation prior to said associated optical fiber being received in said passageway;

a plurality of support tabs positioned in said support channel for locating said sleeve relative to the first mounting retainer, a first support tab being disposed on a bottom wall of the support channel for resisting horizontal movement of said sleeve within said channel in a first direction along said longitudinal axis and a second support tab mounted on a side wall of the support channel for resisting vertical movement of said sleeve within said channel in a second direction transverse said longitudinal axis; and, a mounting flange and a locking rib integrally formed with said first mounting retainer for slidably securing said mounting retainer to an associated base member such that said elastomer sleeve is positively located by said channel, and said associated optical fiber is retained and strain relieved by said elastomer sleeve.

2. The optical fiber retention device as set forth in claim 1 wherein:
said elastomer sleeve defines at least two expandable passageways, the at least two passageways having a common slot extending along a length of said sleeve for receiving said associated optical fibers into said at least two said passageways.

3. The optical fiber retention device as set forth in claim 1 further including a second mounting retainer slidably mountable with said first mounting retainer, each said first and second mounting retainers including a mounting flange proximal to a bottom wall and a mating slot distal to said bottom wall.

4. The optical fiber retention device as set forth in claim 1 wherein said support channel includes side walls for constraining expansion of said elastomer sleeve disposed therein, and said elastomer sleeve compressing said passageway around said associated optical fiber in a post-load orientation with said associated optical fiber received in the passageway.

5. The optical fiber retention device as set forth in claim 1 wherein said sleeve defines a sleeve length, said sleeve length being at least three times said passageway diameter.

6. The optical fiber retention device as set forth in claim 1 wherein said sleeve has a hardness from about 40 shore A to about 80 shore A.

7. The optical fiber retention device as set forth in claim 1 wherein:
the passageway diameter of said expandable passageway in said pre-load orientation is less than said fiber outer diameter.

8. The optical fiber retention device according to claim 1 further including a cover cap member selectively connectable with said first mounting retainer for holding said elastomer sleeve in said U-shaped support channel.

9. The optical fiber retention device according to claim 1 wherein said elastomer sleeve has a non-rectangular cross-section.

10. A fiber retention device comprising:
a mounting retainer formed of a resilient material and having at least one generally U-shaped support channel;
an elastomer sleeve having a length and defining a plurality of expandable passageways extending along the length of said sleeve, the plurality of expandable passageways being configured to receive and position associated fibers therein, each passageway having a passageway diameter in a pre-load orientation prior to said fibers being received in said passageway, and each said associated fiber having a fiber outer diameter;
wherein said at least one support channel includes side walls for constraining expansion of said elastomer sleeve therein, and said elastomer sleeve compressing said passageways around said associated fibers in a post-load orientation with said associated fibers being received in said passageways, and wherein said mounting retainer includes a mounting flange and a locking rib integrally formed with said mounting retainer for adapting said mounting retainer for selective connection with an associated base member such that said sleeve is positively located by said channel, and said associated fiber is retained and strain relieved by said sleeve.

11. The fiber retention device as set forth in claim 10 wherein said base member is a second mounting retainer.

12. The fiber retention device as set forth in claim 10 wherein a first set of passageways extend in a first plane and a second set of passageways extend in a second plane.

13. The fiber retention device as set forth in claim 10 wherein each of said passageways include a slot along the length of said sleeve for receiving said associated fiber into said passageway by moving the associated optical fiber laterally through said slot and into a selected one of said passageways.

14. The fiber retention device as set forth in claim 10 wherein the passageway diameter of the passageways defined by the sleeve in said pre-load orientation is less than said fiber outer diameter of said associated fibers.

15. The fiber retention device according to claim 10 further including a cover cap member selectively connectable with said mounting retainer for holding said elastomer sleeve in said U-shaped support channel.

16. The fiber retention device according to claim 10 wherein said elastomer sleeve has a non-rectangular cross-section.

17. A fiber retention device comprising:
a mounting retainer formed of a resilient material and having at least one generally U-shaped support channel;
an elastomer sleeve having a length and defining a plurality of expandable passageways extending along the length of said sleeve, the plurality of expandable passageways being configured to receive and position associated fibers therein, each passageway having a passageway diameter in a pre-load orientation prior to said fibers being received in said passageway, and each said associated fiber having a fiber outer diameter;
wherein said at least one support channel includes side walls for constraining expansion of said elastomer sleeve therein, and said elastomer sleeve compressing said passageways around said associated fibers in a post-load orientation with said associated fibers being received in said passageways, and wherein said support channel includes a plurality of tabs for locating said sleeve therein, at least one said tab mounted on a bottom wall for resisting horizontal movement of said elastomer sleeve and at least another said tab mounted on a side wall for resisting vertical movement of said elastomer sleeve within said channel.

18. The fiber retention device as set forth in claim 17 wherein said elastomer sleeve has a length at least three times said diameter of said passageways.

19. The fiber retention device as set forth in claim 18 wherein said sleeve has a hardness from about 40 shore A to about 80 shore A.

20. The fiber retention device as set forth in claim 17 wherein said elastomer sleeve has a length at least six times said diameter of said passageway.

21. A fiber retention device comprising:
a mounting retainer formed of a resilient material and having at least one generally U-shaped support channel;

an elastomer sleeve having a length and defining a plurality of expandable passageways extending along the length of said sleeve, the plurality of expandable passageways being configured to receive and position associated fibers therein, each passageway having a passageway diameter in a pre-load orientation prior to said fibers being received in said passageway, and each said associated fiber having a fiber outer diameter;

wherein said at least one support channel includes side walls for constraining expansion of said elastomer sleeve therein, and said elastomer sleeve compressing said passageways around said associated fibers in a post-load orientation with said associated fibers being received in said passageways, and wherein at least two said passageways have a common slot extending along the length of said sleeve for receiving said associated fibers into said at least two said passageways by moving at least one of the associated fibers laterally through said common slot into a selected one of said at least two passageways.

22. A fiber retention device comprising:

a base member having one or more generally U-shaped support channels;

an elastomer sleeve defining a plurality of expandable passageways for positioning associated fibers relative to said sleeve, said passageways having a diameter and said fibers having a diameter;

at least two said passageways having a common slot extending along the length of said sleeve for receiving said fibers into said at least two said passageways;

said support channel including a plurality of tabs for locating said sleeve therein, at least one said tab being mounted on a bottom wall for resisting relative horizontal movement between said sleeve and said base member and at least another said tab being mounted on a side wall for resisting relative vertical movement between said base member and said sleeve disposed within said channel; and, wherein said support channel includes side walls for constraining expansion of said elastomer sleeve therein, and said elastomer sleeve being configured to compress said passageways around said fibers in a post-load orientation with said associated fiber received in said passageway.

23. The fiber retention device as set forth in claim 22 wherein said base member is selected from the group consisting of a splice tray, an enclosure, a cabinet, and a mounting retainer.

24. The fiber retention device as set forth in claim 22 wherein said sleeve defines a sleeve length being at least three times said passageway diameter.

25. The fiber retention device as set forth in claim 24 said sleeve has a hardness from about 40 shore A to about 80 shore A.

26. The fiber retention device as set forth in claim 22 wherein said diameter of the passageways prior to said fibers being received in the passageways is less than said diameter of said associated fibers.

27. The fiber retention device as set forth in claim 22 wherein said plurality of passageways of the sleeve are adapted to receive associated tubular objects including optical fibers, tubing, cables, buffer tubes and other elongate objects.

28. The fiber retention device as set forth in claim 22 wherein said elastomer sleeve has a substantially rectangular cross section in a plane perpendicular to an axis defined by the passageways of said elastomer sleeve.

29. The fiber retention device according to claim 22 further including a cover cap member selectively connectable with said base member for holding said elastomer sleeve in said U-shaped support channel.

30. The fiber retention device according to claim 22 wherein said elastomer sleeve has a non-rectangular cross-section.

\* \* \* \* \*